US007750686B2

(12) United States Patent  
Liu

(10) Patent No.: US 7,750,686 B2  
(45) Date of Patent: Jul. 6, 2010

(54) CIRCUIT AND METHOD FOR MATCHING CURRENT CHANNELS

(75) Inventor: Jing-Mong Liu, Jubei (TW)

(73) Assignee: Richtek Technology Corporation, Hsin-Chu (TW)

( * ) Notice: Subject to any disclaimer, the term of this patent is extended or adjusted under 35 U.S.C. 154(b) by 347 days.

(21) Appl. No.: 11/904,876

(22) Filed: Oct. 1, 2007

(65) Prior Publication Data

US 2008/0191644 A1 Aug. 14, 2008

(30) Foreign Application Priority Data

Feb. 9, 2007 (TW) ............................... 96104821 A

(51) Int. Cl.
*H03K 5/22* (2006.01)
*H03B 1/00* (2006.01)

(52) U.S. Cl. ......................................... 327/72; 327/108

(58) Field of Classification Search .................. 327/72, 327/108; 341/133, 136, 144, 148; 345/76, 345/77, 80, 82; 323/282

See application file for complete search history.

(56) References Cited

U.S. PATENT DOCUMENTS

| | | | | |
|---|---|---|---|---|
| 3,940,760 A | * | 2/1976 | Brokaw | ....................... 341/119 |
| 4,124,824 A | * | 11/1978 | Kreinick et al. | ............. 330/252 |
| 7,315,268 B1 | * | 1/2008 | Hong | .......................... 341/142 |
| 7,443,325 B2 | * | 10/2008 | Hong | .......................... 341/143 |
| 7,511,572 B2 | * | 3/2009 | Moyer | ......................... 330/110 |

FOREIGN PATENT DOCUMENTS

| KR | 10-2004-34684 | 4/2004 |
|---|---|---|
| KR | 10-2005-33146 | 4/2004 |
| KR | 10-2004-39408 | 4/2005 |

* cited by examiner

*Primary Examiner*—Thuy Vinh Tran
(74) *Attorney, Agent, or Firm*—Tung & Associates

(57) ABSTRACT

The present invention discloses a current-matching method comprising steps of: providing a plurality of current channels; grouping the plurality of current channels into W sets, each of which has Q channels; and matching the channels of the same set in current, where both W and Q are integers greater than or equal to 2. The present invention also discloses a current-matching circuit including hierarchical tree structure having two or more levels, each of which includes multiple matching devices, wherein each matching device at a preceding level corresponds to a predetermined number of matching devices at a next level. Respective matching devices at a last level control currents in respective current channels; the channels of the same group are matched with one another in current.

20 Claims, 8 Drawing Sheets

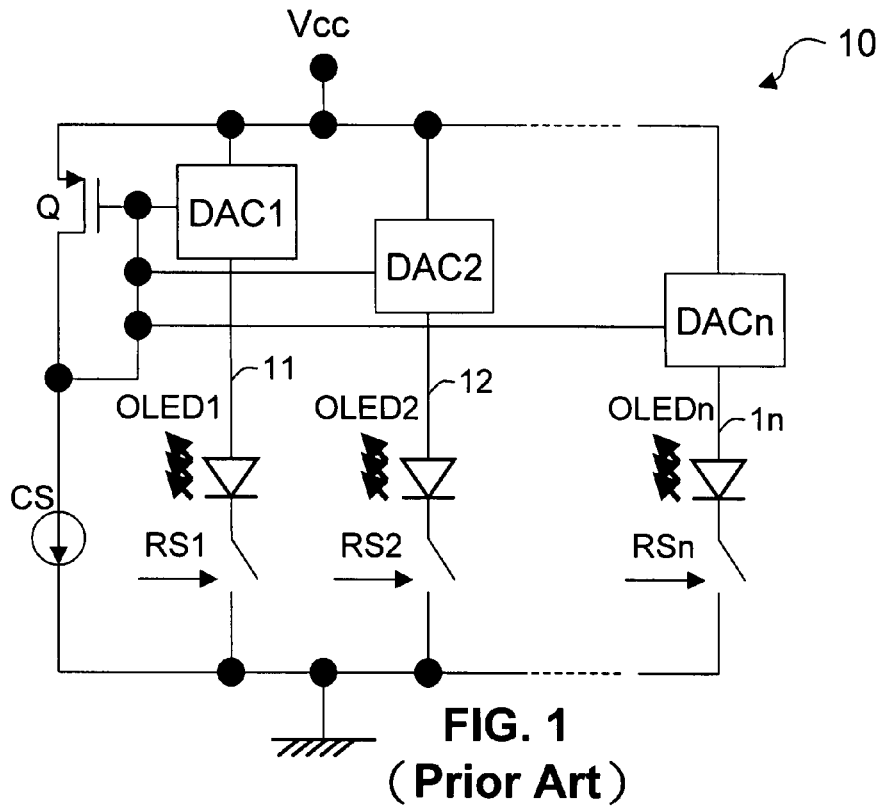
FIG. 1
(Prior Art)
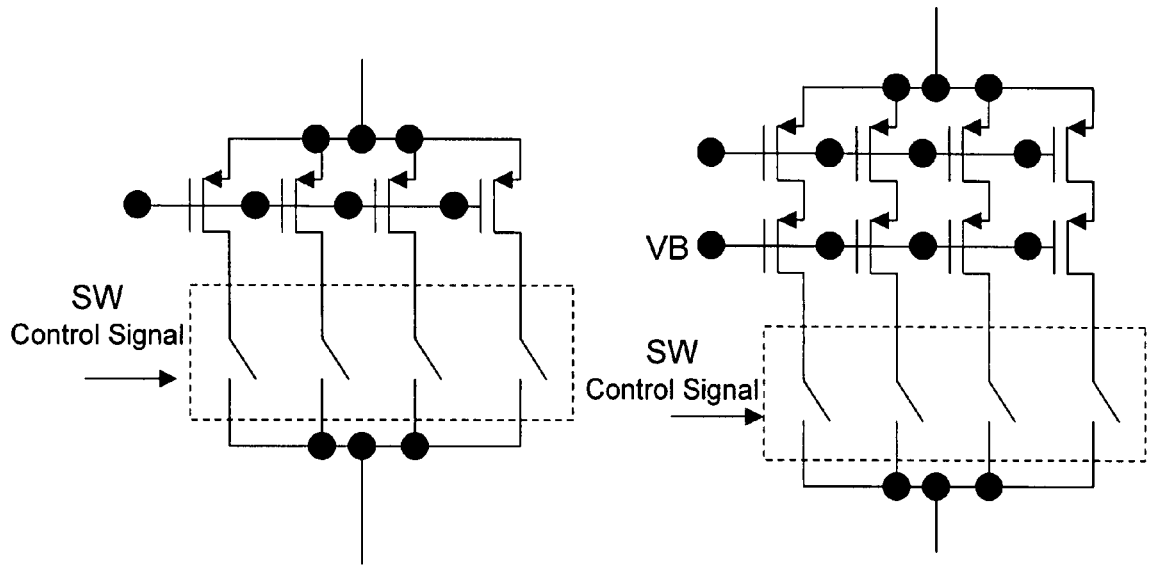
FIG. 2
(Prior Art)
FIG. 3
(Prior Art)

$I \times R \gg V_{ofs}$

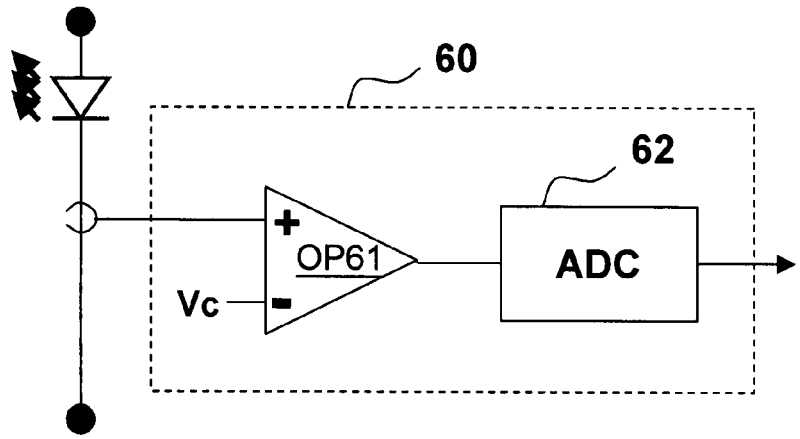
FIG. 13
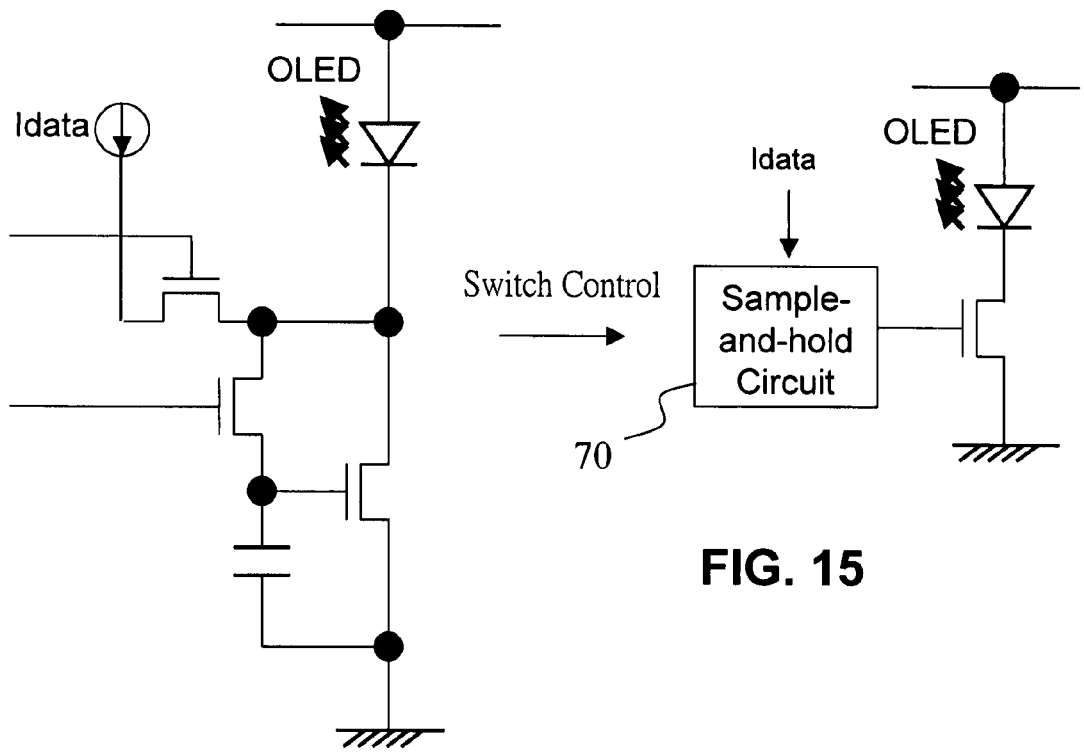
FIG. 14
FIG. 15

CIRCUIT AND METHOD FOR MATCHING CURRENT CHANNELS

FIELD OF THE INVENTION

The present invention relates to a circuit and a method for matching current channels, and in particular, to a circuit and a method capable of matching a plurality of current channels with one another in current amount. The circuit and the method are particularly suitable for Organic Light Emitting Diode (abbreviated as OLED hereinafter) panels.

BACKGROUND OF THE INVENTION

FIG. 1 illustrates an example of a conventional control circuit for a passive OLED panel. As shown in FIG. 1, a circuit 10 includes n OLEDs OLED1-OLEDn, which are placed in channels 11-1n, respectively, and the conduction of the channels 11-1n are controlled by corresponding row signals RS1-RSn. In the passive OLED panel, the raw signals RS1-RSn turn ON the channels in turn so as to form a perceivable image by vision persistence. The brightness of the OLEDs OLED1-OLEDn correspond to the current amounts flowing in the channels 11-1n, respectively. Each of the channels 11-1n is controlled by a corresponding digital to analog converter DAC1-DACn. For simplicity, each of the digital to analog converter circuits DAC1-DACn is shown to be connected to only one OLED in FIG. 1, but more than one OLEDs may be connected to each of the digital to analog converter circuits in a real panel. The digital to analog converter circuits DAC1-DACn may be the simple type shown in FIG. 2 or the cascoded type shown in FIG. 3.

Specifically, the brightness of each of the OLEDs OLED1-OLEDn is controlled in the following manner. The current amount of a current source CS is proportionally mirrored into the digital to analog converter circuits DAC1-DACn by current mirrors consisting of a transistor Q and transistors in the respective digital to analog converter circuits DAC1-DACn. A digital switch control signal SW (also called as column signal or segment signal) determines which transistors in the digital to analog converters should be conducted. For example, as shown in FIG. 2, the conduction current amounts in the transistors may be designed as 1×, 2×, 4×, and 8×, respectively, and accordingly a 16-level brightness can be generated based on the switch control signal SW.

As sizes of OLED panels increase, the number of OLEDs used therein increase. As a consequence, the number of channels of OLEDs in one OLED panel may be more than several hundred or even up to several thousand. Such increasing number of channels causes a problem that current channels can not be easily matched with one another in current amount, and accordingly the brightness across the panel is not uniform. Such non-uniformness can sometimes be perceivable, in a worse case. One approach for solving such a problem is to provide respective matching control circuits dedicated to respective channels and to sequentially conduct a matching check and calibration procedure by sample-and-hold for every channel. However, such an approach is not practical because it requires an enormous sophisticated circuit and a time-consuming check procedure. Therefore, a circuit and a method to efficiently match the plurality of channels with one another in current amount are desired.

SUMMARY

In view of the problems of the prior art, the present invention provides a circuit for matching a plurality of current channels in current amount without increasing the scale and complexity of the circuit significantly.

A second object of the present invention is to provide an OLED panel control circuit.

A third object of the present invention is to provide a method for matching a plurality of channels with one another in current amount.

To achieve the foregoing objects of the present invention, in one aspect of the present invention, a current matching circuit comprises a hierarchical tree structure having X levels, in which each level includes a plurality of matching devices, a matching device at a preceding level corresponding to a predetermined number of matching devices at a next level, and the predetermined number of matching devices forming a group; and each of the matching devices in respective groups at a last level of the structure controls current in a corresponding channel, and the channels of the same group at the last level are matched with one another in current, where X is an integer greater than or equal to 2.

In addition, according to another aspect of the present invention, an OLED panel control circuit comprises: a plurality of first digital to analog converter circuits for controlling currents in corresponding channels, on each of which is provided a light emitting diode, respectively, wherein the first digital to analog converter circuits are grouped into W sets, each of which has Q digital to analog converter circuits; W current sources supplying current amounts controlled by corresponding reference voltages, respectively; and W current mirror circuits proportionally mirroring the current amounts supplied by W current sources into Q digital to analog converter circuits of the same set, wherein the W current sources are grouped into M sets, each of which has N current sources (W=M*N), the reference voltages in the current sources of the same group are controlled in such a manner that N*Q channels are matched with one another in current amount, where M, N, Q, and W are integers, and N, Q, and W are greater than or equal to 2.

Moreover, according to still another aspect of the present invention, a current matching method comprises steps of: providing a plurality of current channels; grouping the plurality of current channels into W sets, each of which has Q channels; and matching the channels of the same set in current, where both W and Q are integers greater than or equal to 2.

Preferably, the current amounts in the respective channels of the same set at the last level can be sequentially controlled by way of sample-and-hold, while different sets are controlled in parallel.

Also preferably, if current sources are used to control current, they can be grouped into various sets, and the same reference voltage may be applied to the respective current sources of the same set; or, each current source of the same set receives a corresponding reference voltage, and the reference voltage is calibrated so that every current source of the same set produces the same amount of current.

BRIEF DESCRIPTION OF THE DRAWINGS

These and other objects, features, and advantages of the present invention will be more readily apparent from the following description and appended claims when taken in conjunction with the accompanying drawings, in which FIG. 1 shows a schematic diagram of a conventional passive OLED panel control circuit;

FIG. 2 shows a schematic diagram of a simple type of digital to analog converter circuit;

FIG. 3 shows a schematic diagram of a cascoded type of digital to analog converter circuit;

FIG. 13 illustrates an example of a sample-and-measurement circuit; and

FIGS. 14 and 15 show examples of control circuits for active OLEDs, respectively.

DESCRIPTION OF THE PREFERRED EMBODIMENTS

Figure 4:
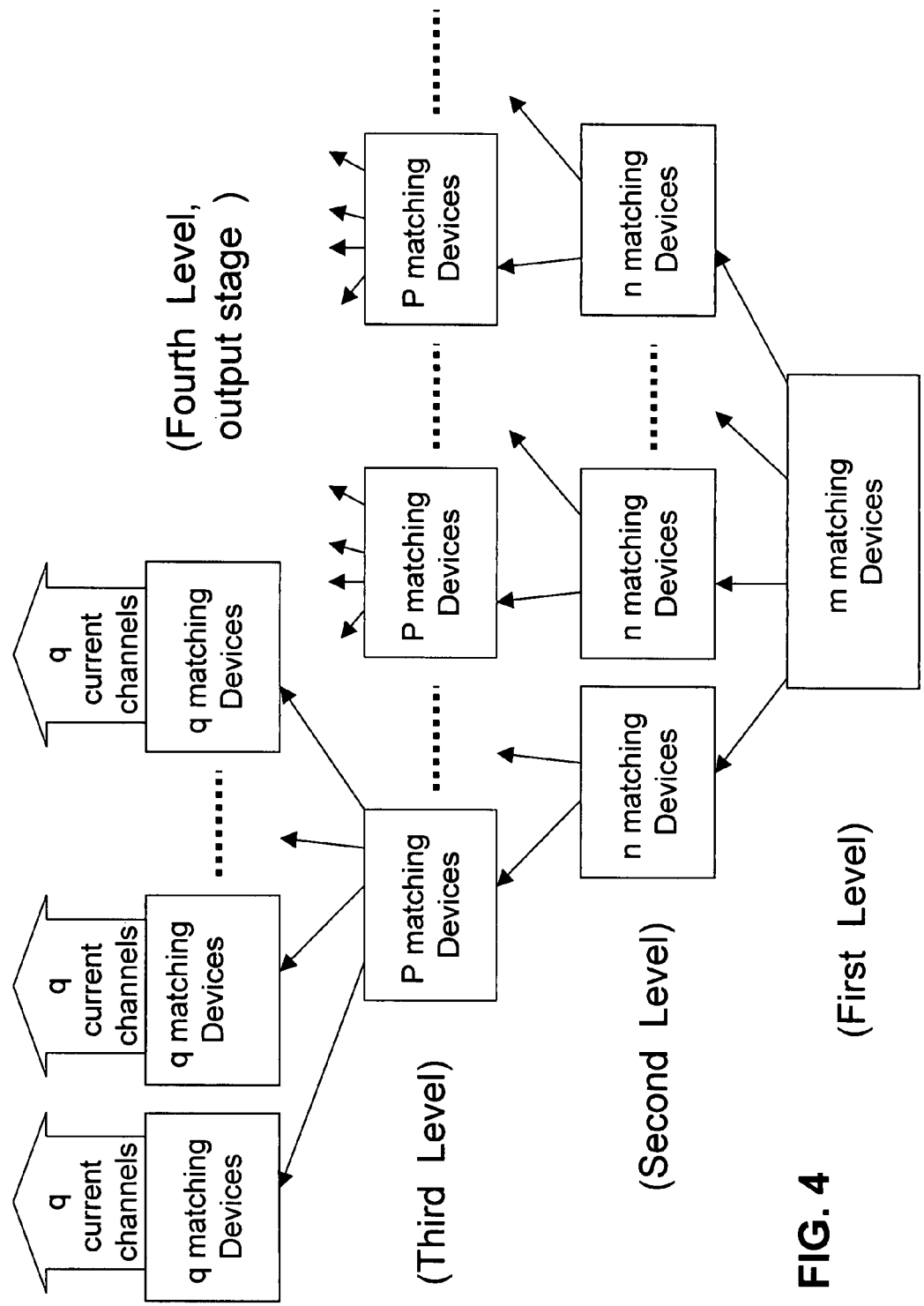
FIG. 4 shows a hierarchical tree structure according to one embodiment of the present invention, illustrating the concept of the present invention.

The present invention will first be explained with respect to its principle. As described in the section "Description of Related Art", the number of channels of OLEDs in a large size OLED panel may be more than several hundred or even up to several thousand, and it is difficult to calibrate their matching conditions one by one. Therefore, according to the present invention, a "hierarchical tree structure" is employed to solve the above problem. Referring to FIG. 4, a 4-level hierarchical tree structure is used for current-matching in a circuit. As shown in the figure, m devices are allotted to the first level and are matched with one another, and m sets, each of which has n devices matched with one another, are allocated to the second level. At the third level, each device at the second level corresponds to p devices, and each of the p devices of the same set is matched with the other devices of the same set. Similarly, at the fourth level, each device at the third level corresponds to q devices, and each of the p devices of the same set is matched with the other devices of the same set. As a consequence, m*n*p*q current channels can be controlled, while none of the numbers m, n, p, and q are large numbers. Of course, FIG. 4 is only an example to explain the hierarchical tree structure. The number of the levels in the structure and the number of devices in each level can be varied based on design requirements.

Figure 5:
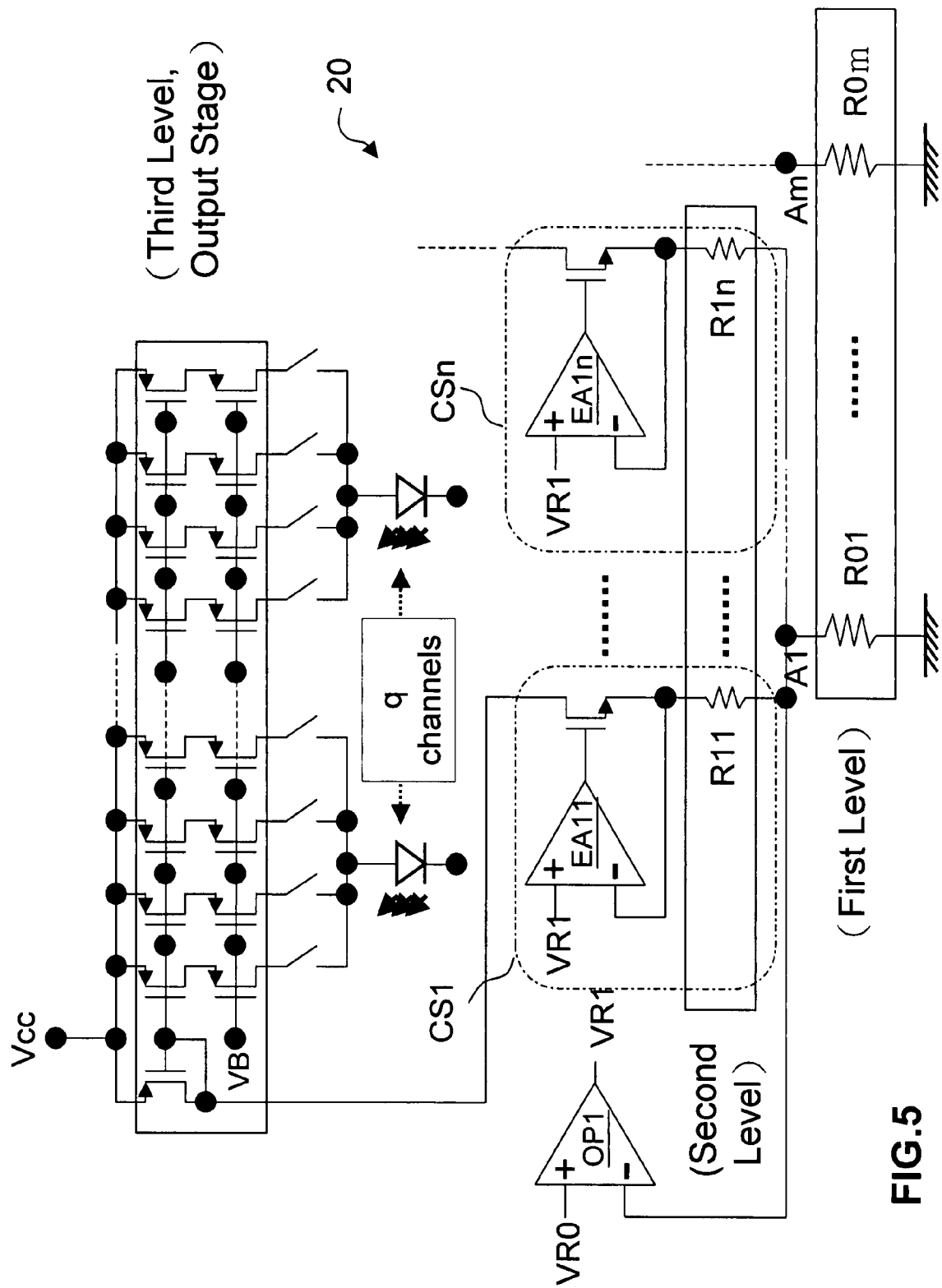
FIG. 5 shows a schematic diagram of a current-matching circuit according to one embodiment of the present invention.
Figure 6:
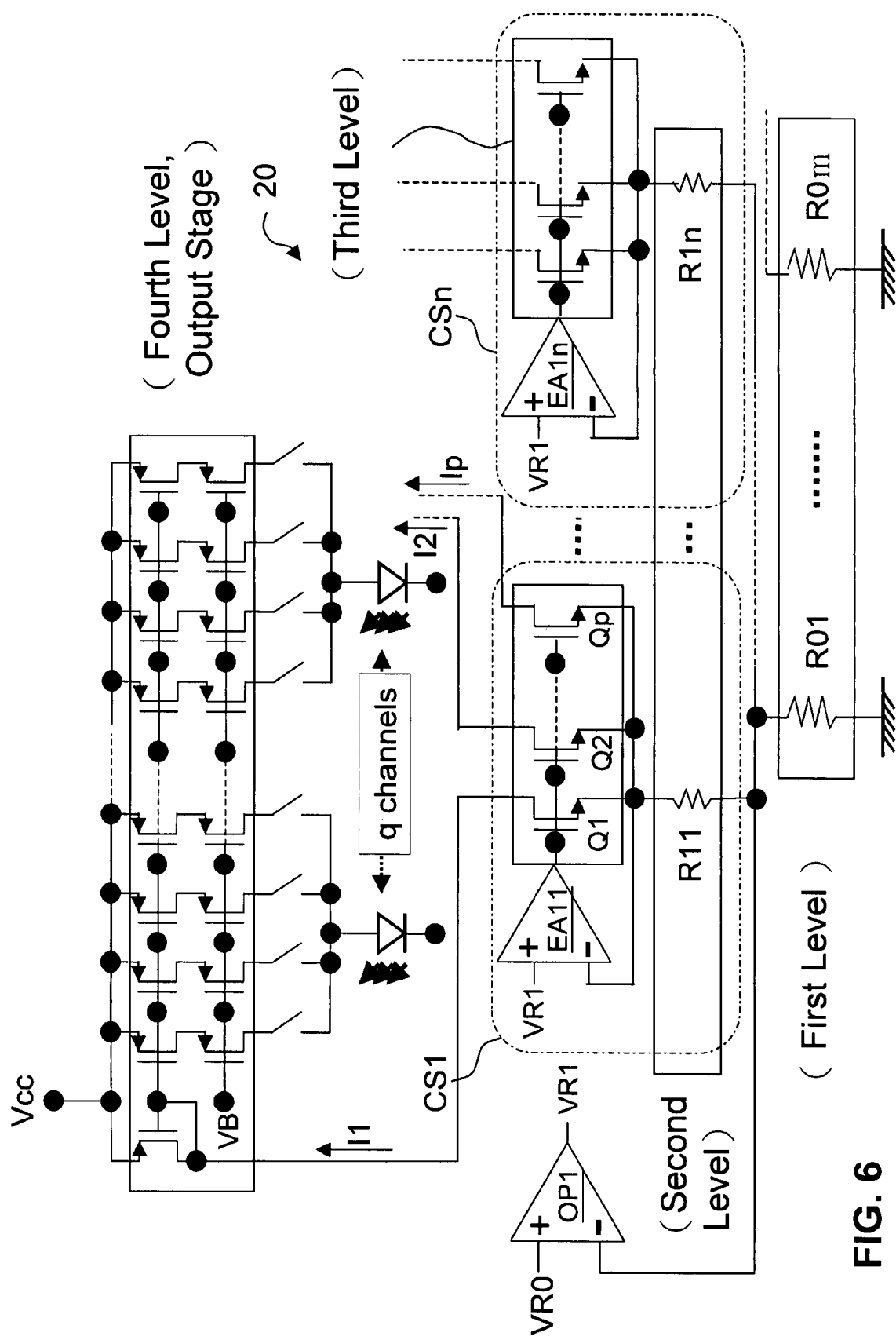
FIG. 6 shows a schematic diagram of a current-matching circuit according to another embodiment of the present invention.

Two embodiments embodying the principle shown in FIG. 4 will be explained with reference to FIGS. 5 and 6. FIG. 5 shows a hierarchical tree structure having 3 levels, and FIG. 6 shows one having 4 levels. First, referring to the embodiment of FIG. 5, the matching devices at the first level are resistors R01-R0$m$; the matching devices at the second level are resistors R11-R1$n$; and the third level is an output stage. As shown in the figure, in a first set of circuit at level 2, an operation amplifier OP1 compares a voltage at a node A1 with a reference voltage VR0, and accordingly generates an output voltage VR1 which is supplied to all of the error amplifiers EA11-EA1$n$. The error amplifiers EA11-EA1$n$ are components of corresponding current sources CS1-CSn. Each of the current sources CS1-CSn controls its corresponding set of output stage circuit. Each set of the output stage circuit controls the current amounts of q current channels according to its corresponding current source. By virtue of this structure, q current channels in each set of the output stage circuit are controlled by the same current source so as to be matched with one another. Since q is not a great number, it will not result in significant mismatching between channels due to large circuit area and long wiring. As to the current sources CS1-CSn controlling the respective sets of output stage circuits, they are matched with one another at the level 2 by way of the matching between resistors R11-R1$n$ and the output from the operation amplifier OP1. The voltages at nodes A1-Am in the sets at the second level are matched with one another by resistors R01-R0$m$ at the first level.

FIG. 6 illustrates another embodiment wherein the hierarchical tree structure has 4 levels. In comparison with the preceding embodiment, this embodiment includes an additional level (the third level), and its fourth level is an output stage corresponding to the third level of the preceding embodiment. As shown in the figure, in a first set of circuit at the third level according to this embodiment, a current source CS1 includes a plurality of transistors Q1-Qp, generating p sets of same currents I1-Ip to p sets of output stage circuits in conjunction with the operation amplifier EA11.

Figure 7:
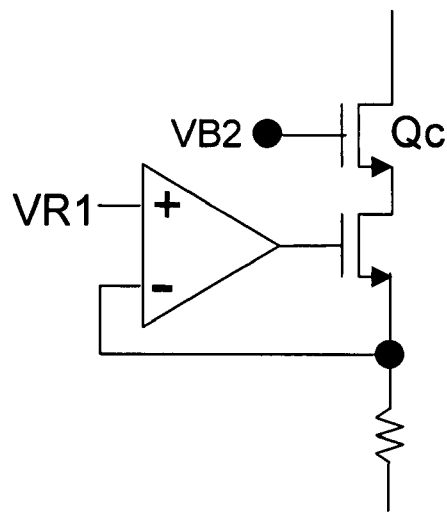
FIG. 7 shows a diagram of a current source circuit using cascoded transistors.

Preferably, as shown in FIG. 7, a transistor Qc can be additionally cascoded to the current source of the above embodiments illustrated in FIGS. 5 and 6, so as to further increase the accuracy and precision of the current source.

The above embodiments according to the present invention have the following advantages over the prior art. In the above embodiments of the present invention, all levels except the output stage may employ matching devices having better matching properties, such as resistors, instead of MOSFETs. Resistors have much better matching properties in comparison with MOSFETs, because the mismatching between resistors is only attributed to the variation between their sizes, whereas the mismatching between MOSFETs is further affected by surface effects such as threshold voltage and mobility. In modern semiconductor process, the dimension of a device can be controlled within a precise range, and therefore resistors are much better than MOSFETs.

Figure 8:
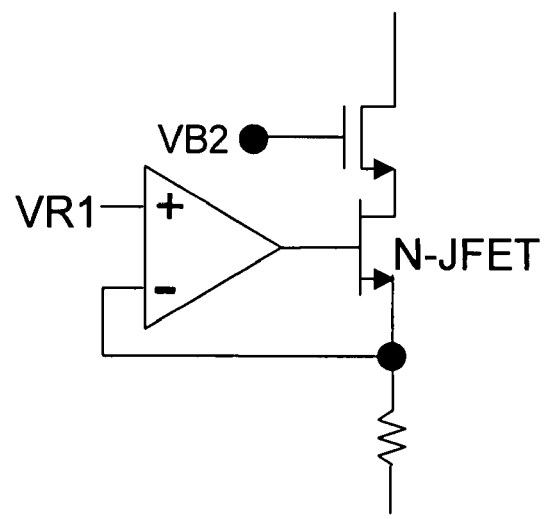
FIGS. 8 and 9 show examples using a Junction Field Effect Transistor (JFET), respectively.
Figure 9:
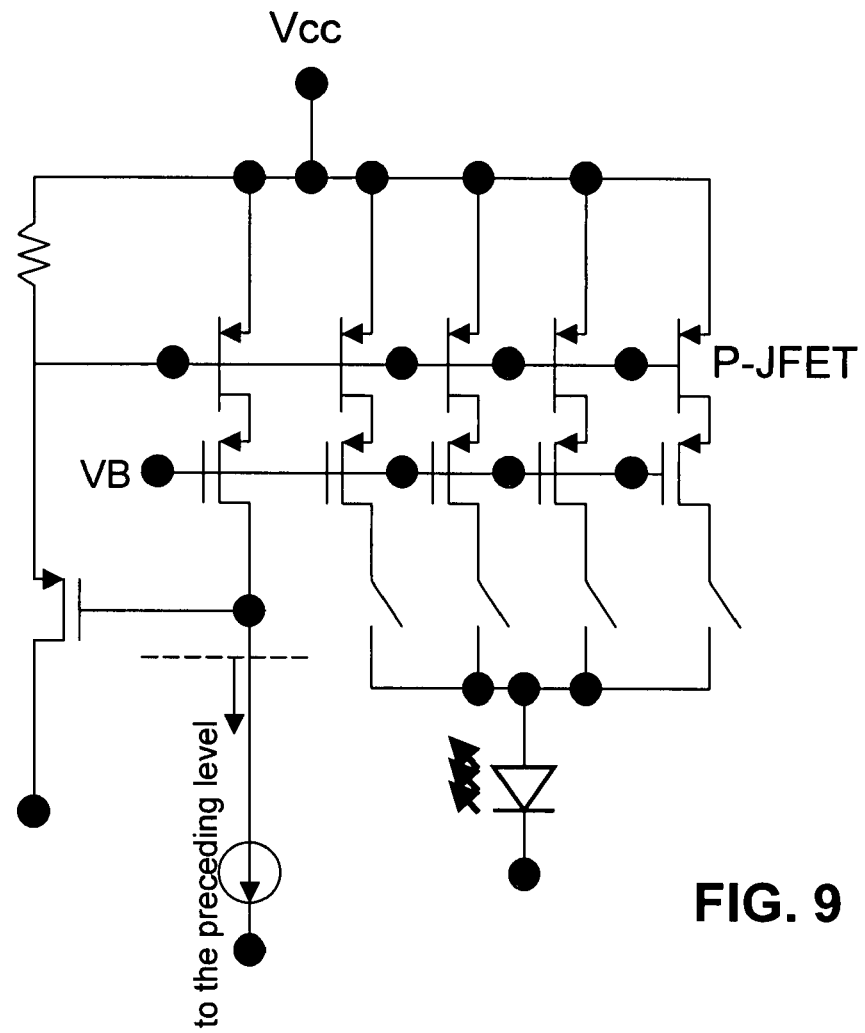

FIGS. 8 and 9 illustrate two other embodiments according to the present invention, in which the MOSFETs in the cascoded transistor structure (as shown in FIG. 3 or 7, for example) are respectively replaced by junction field effect transistors (JFETs). Similarly, the mismatching between JEFTs is only attributed to the variation between their sizes, and thus JEFTs have better matching properties in comparison with MOSFETs. The circuits illustrated in FIGS. 8 and 9 can be applied to any level in the circuits according to the present invention, including the output stage.

Figure 10:
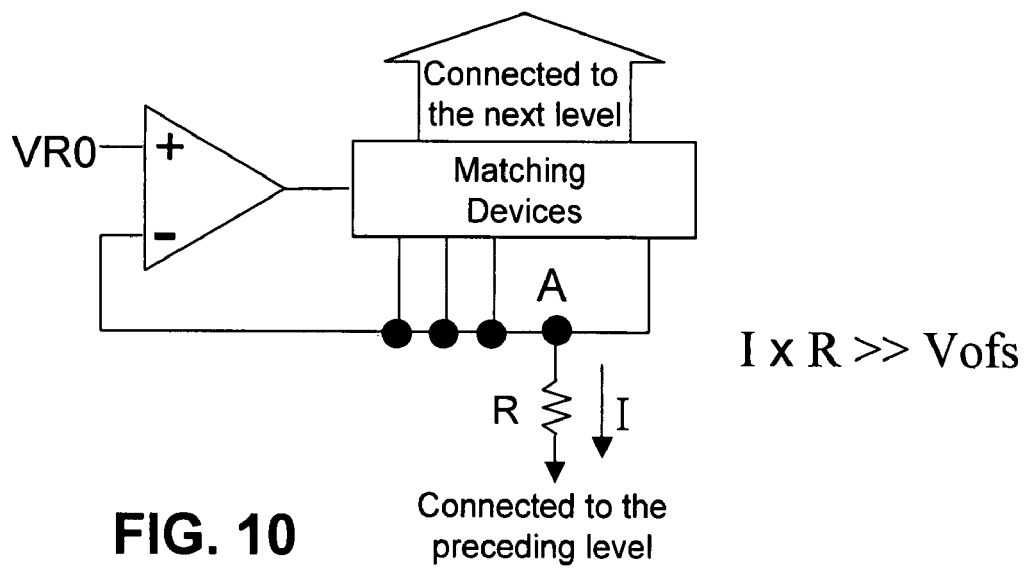
FIG. 10 is a view explaining discrepancies between amplifiers do not substantially affect the matching between devices in a whole circuit.

Further, although the operation amplifiers and the error amplifiers in the embodiments shown in FIGS. 5 and 6 may have variations in their input offset voltages, as shown in FIG. 10, the voltage at the node A is much higher than the input offset voltage Vofs of the amplifier, and thus the mismatching between amplifiers will not substantially affect the matching of the whole circuit.

Figure 11:
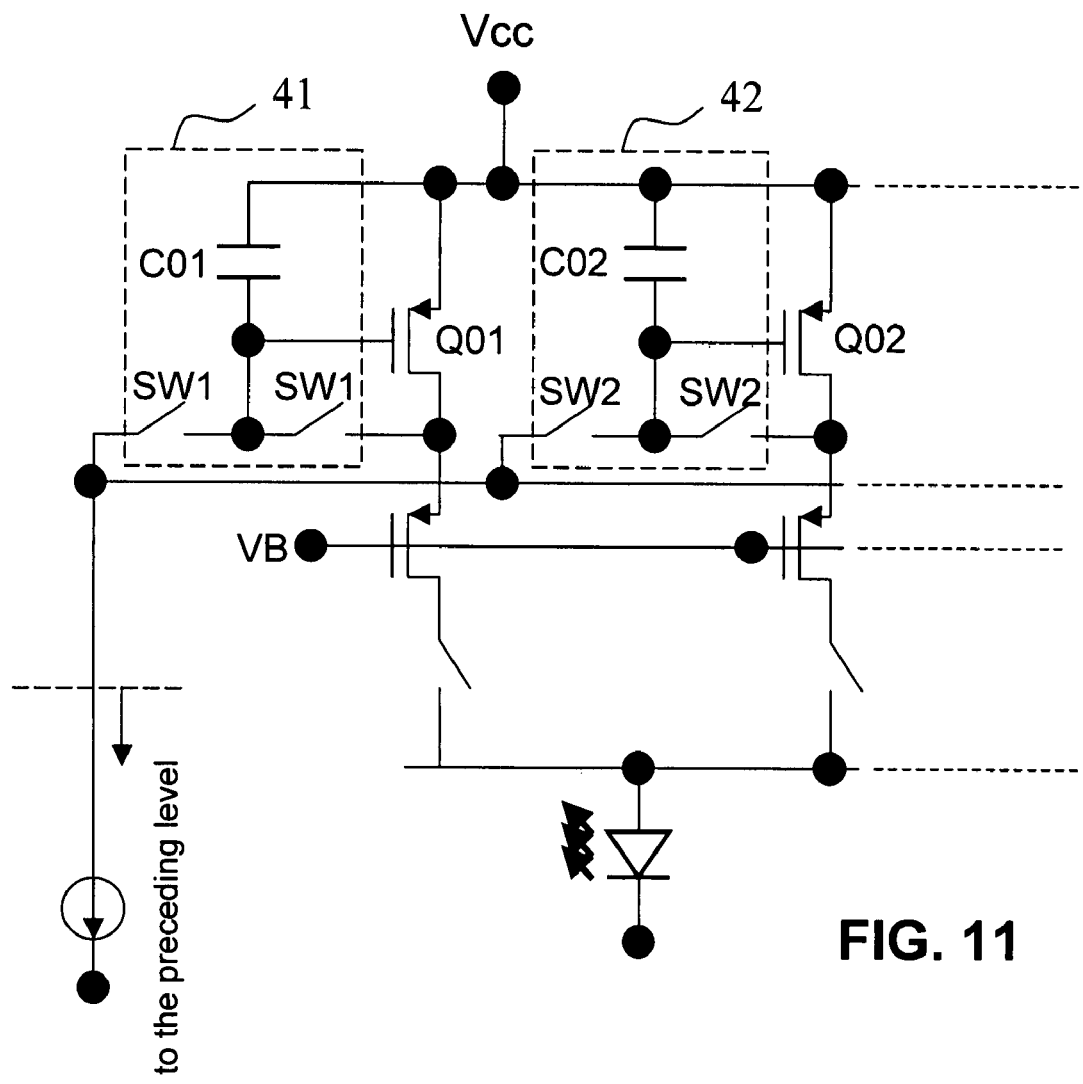
FIG. 11 illustrates an example of a sample-and-hold circuit.

The above embodiments are already advantageous over the prior art; however, more preferably, the matching between current channels at the output stage can be further assured by adding a sample-and-hold circuit. FIG. 11 illustrates one example of the sample-and-hold circuit. As shown in FIG. 11, currents flowing through transistors Q01, Q02 . . . can be kept the same by switching switches SW1, SW2 . . . , sequentially, and the corresponding voltages between gates and sources can be stored in capacitors C01, C02 . . . , respectively. Thus, the transistors can be matched with one another more precisely. The sample-and-hold circuit requires a "scan" operation, i.e., to switch the transistors sequentially, and because such operation is time-consuming, it is impractical for the prior art to scan hundreds of or thousands of current channels sequentially. However, in the present invention, the current channels in respective sets can be scanned in parallel and the number of current channels in one set is not too great (which may be a single digit number), and accordingly the scanning procedure can be completed in a limited short period. The scanning procedure for the sample-and-hold circuit may be executed upon booting, and/or periodically during operation of the current-matching circuit.

Figure 12:
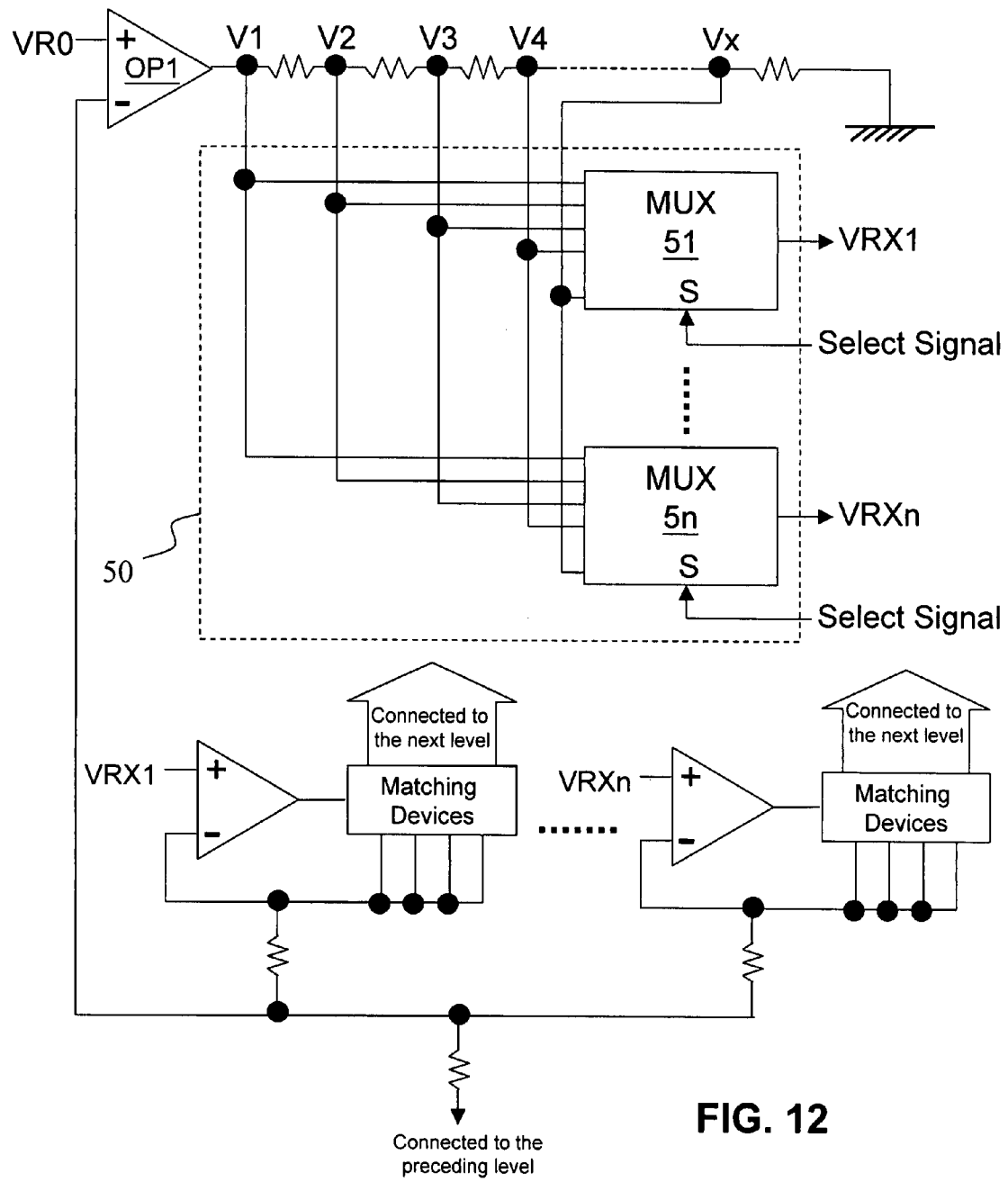
FIG. 12 illustrates an example of a calibration circuit.

According to the present invention, the input reference voltages of the respective error amplifiers can be a means for matching adjustment. Please refer to FIG. 12 as well as FIGS. 5 and 6. Each of the operation amplifiers OP1 in the embodiments shown in FIGS. 5 and 6 has only one output level, and all of the error amplifiers EA11-EA1$n$ receive the same reference voltage input. The embodiment shown in FIG. 12 provides a calibration circuit 50 which includes n multiplexing circuits MUX 51-5$n$. The operation amplifier OP1 provides multiple output levels V1-Vx. Each of the multiplexing circuits 51-5$n$ selects one of the output levels of the operation amplifier OP1 according to a corresponding select signal S inputted thereto. In this embodiment, the signal S may be a digital calibration signal consisting of multiple digits, and the matching between circuit sets can be adjusted by selecting the output level of the operation amplifier OP1. The digital calibration signal may be generated, for example, by sample-and-measure the current flowing in a certain current channel of each of the current sets during the calibration procedure. There are many possible approaches to construct the sample-and-measure circuit. For example, as shown in a circuit 60 in FIG. 13, a voltage signal converted from a current signal is compared with a reference voltage Vc; the difference is amplified by an operation amplifier OP61, and further converted to a digital signal by an analog to digital converter ADC62. The sample-and-measure circuit may be built in the current-matching circuit, in another circuit (such as an OLED panel circuit) cooperating with the current-matching circuit, or in a calibration tool. The calibration procedure can be executed upon booting, and/or periodically during operation of the circuit.

Although OLED control circuits for passive OLED panels are taken as examples in the above descriptions, the present invention can also be applied to active OLED panels. The OLEDs in the active OLED panel are controlled in an active manner. FIGS. 14 and 15 show two examples, in which the light emission and brightness of an OLED are controlled by a current signal Idata. According to the present invention, the active OLEDs can be matched with one another as well, in a manner similar to the above embodiments, for achieving the best panel display effect.

As seen from the foregoing description, the present invention provides better matching with simpler circuit structure. However, it should be understood that the preferred embodiments are provided to illustrate the spirit of the invention, to enable those skilled in this art to realize the present invention, but not to limit the scope of the invention. Various modifications and variations may be made by those skilled in this art without departing from the spirit of the present invention. For example, an additional device such as a delay circuit or a switch circuit which does not affect the primary function of the overall circuit may be interposed between any two directly interconnected devices shown in the embodiments. As another example, the tree structure for controlling the matching between current channels of OLEDs is only one of the applications that the present invention may be applied to; the principle of the present invention can also be applied to any other application requiring current matching. In view of the foregoing, it is intended that the present invention cover all such modifications and variations, which should be interpreted to fall within the scope defined by the appended claims and their equivalents.

What is claimed is:

1. A current-matching circuit comprising a hierarchical tree structure having X levels, each of which includes a plurality of matching devices, wherein each matching device at a preceding level corresponds to a predetermined number of matching devices at a next level, and the predetermined number of matching devices form a group; respective matching devices in respective groups at a last level of the hierarchical tree structure control currents in respective current channels; and the channels of the same group are matched with one another in current, where X is an integer greater than or equal to 2.

2. The current-matching circuit as claimed in claim 1, wherein each group at the last level is controlled by a corresponding current source.

3. The current-matching circuit as claimed in claim 2, wherein each current source includes a plurality of transistors, which cooperate with a same error amplifier to generate a plurality of currents of substantially the same amount.

4. The current-matching circuit as claimed in claim 2, wherein the current-matching circuit includes a plurality of groups of current sources at one of the levels, and the current sources in the same group receive a same reference voltage which is generated based on a node voltage between the group and its preceding level.

5. The current-matching circuit as claimed in claim 4, wherein the node voltage is inputted to an operation amplifier to be compared with a given voltage, and an output of the operation amplifier is used as the reference voltage.

6. The current-matching circuit as claimed in claim 2, wherein the current-matching circuit includes a plurality of groups of current sources at one of the levels, and the current amount of each of the current sources is adjustable.

7. The current-matching circuit as claimed in claim 6, wherein the current sources receive corresponding reference voltages, respectively, and each of the reference voltages for the current sources of the same group is adjustable according to a corresponding select signal.

8. The current-matching circuit as claimed in claim 6, in which the current sources receive corresponding reference voltages, respectively, and each of the reference voltages for the current sources of the same group is controlled by a corresponding output of an operation amplifier, wherein the operation amplifier provides a plurality of outputs, and a corresponding relation between the respective current sources and the respective outputs is determined by a select signal.

9. The current-matching circuit as claimed in claim 1 further comprising sample-and-hold circuits for controlling the currents in the channels, respectively.

10. The current-matching circuit as claimed in claim 9, wherein the sample-and-hold circuits control all of the groups in parallel, and each sample-and-hold circuit controls the respective channels of the corresponding group sequentially.

11. The current-matching circuit as claimed in claim 9, wherein the matching devices at the last level include a plurality of groups of transistors, and the sample-and-hold circuits sample and hold voltages of all the groups in parallel, while each sample-and-hold circuit samples and holds a gate-to-source voltage of the respective transistors of the corresponding group sequentially.

12. The current-matching circuit as claimed in claim 1, wherein the matching devices include one or more selected from a group consisting of: resistors, junction field effect transistors, metal oxide field effect transistors, and amplifiers.

13. A current-matching method comprising the steps of:
providing a plurality of current channels;
grouping the plurality of current channels into W sets, each of which has Q channels; and
matching the channels of the same set in current, where both W and Q are integers greater than or equal to 2.

14. The current-matching method as claimed in claim 13, further comprising the steps of:
grouping said W sets into M groups, each of which has N sets;
providing each of the sets with a matching device; and
matching the matching devices of respective sets in the same group,
where M and N are integers greater than or equal to 2.

15. The current-matching method as claimed in claim 13, wherein the matching devices include one or more selected from a group consisting of resistors, junction field effect transistors, metal oxide field effect transistors, and amplifiers.

16. The current-matching method as claimed in claim 13 further comprising the steps of: scanning channels of respective sets in parallel in such a manner that the channels in the same set are scanned sequentially, and currents in the channels are sampled and held.

17. The current-matching method as claimed in claim 13, wherein the step of matching the channels of the same set in current includes the steps of: providing the set with a current source, and proportionally mirroring a current amount of the current source into the channels in the same set.

18. The current-matching method as claimed in claim 17, further comprising the steps of: providing each of the sets with one current source, and grouping the current sources into M groups, each of which has N current sources, where both M and N are integers greater than or equal to 2; and the current sources in the same group receive a same reference voltage.

19. The current-matching method as claimed in claim 17, further comprising steps of: providing each of the sets with one current source, which are grouped into M groups each having N current sources, wherein both M and N are integers greater than or equal to 2; and the current sources in the same group receive corresponding reference voltages, respectively, and each of the reference voltages for the current sources of the same group is adjustable according to a corresponding select signal.

20. The current-matching method as claimed in claim 19, wherein said select signal is generated by sampling and measuring current from a portion of a corresponding channel.

* * * * *

UNITED STATES PATENT AND TRADEMARK OFFICE
CERTIFICATE OF CORRECTION

| | | |
|---|---|---|
| PATENT NO. | : 7,750,686 B2 | Page 1 of 1 |
| APPLICATION NO. | : 11/904876 | |
| DATED | : July 6, 2010 | |
| INVENTOR(S) | : Liu | |

It is certified that error appears in the above-identified patent and that said Letters Patent is hereby corrected as shown below:

ON THE TITLE PAGE OF THE PATENT:

Item [75] Inventor:

Please change "Jing-Mong Liu" to --Jing-Meng Liu--.

Signed and Sealed this
Seventh Day of January, 2014

Margaret A. Focarino
*Commissioner for Patents of the United States Patent and Trademark Office*